United States Patent [19]
Dias

[11] Patent Number: 6,123,146
[45] Date of Patent: Sep. 26, 2000

[54] AIR CONDITIONING INSTALLATION WITH AN EXTERNAL TEMPERATURE ESTIMATOR, ESPECIALLY FOR A MOTOR VEHICLE

[75] Inventor: Dominique Dias, 78960 Voisins Le Bretonneux, France

[73] Assignee: Valeo Electronique, Creteil, France

[21] Appl. No.: 08/961,483

[22] Filed: Oct. 30, 1997

[30] Foreign Application Priority Data

Oct. 31, 1996 [FR] France .................................... 96 13365

[51] Int. Cl.[7] ...................................................... F25B 29/00
[52] U.S. Cl. ......................... 165/202; 165/11.1; 165/42; 165/43; 165/203; 165/295; 236/91 C; 236/91 F; 62/229
[58] Field of Search ..................................... 165/202, 203, 165/205, 295, 42, 43, 11.1; 236/91 C, 91 F; 62/229; 237/5

[56] References Cited

U.S. PATENT DOCUMENTS

| | | | |
|---|---|---|---|
| 4,460,035 | 7/1984 | Mizote et al. ................................ | 165/42 |
| 5,810,078 | 9/1998 | Knutsson et al. ........................... | 165/42 |
| 5,937,941 | 8/1999 | Gach .......................................... | 165/42 |

FOREIGN PATENT DOCUMENTS 0155111  7/1987  Japan ............................................ 237/5

OTHER PUBLICATIONS

English translation of JP 08 258535 A (Nippon Denso Co Ltd), Oct. 8, 1996.
English translation of JP 63 287619 A (Nippon Denso Co Ltd), Nov. 24, 1988.
English translation of JP 05 115522 A (Nissan Motor Co Ltd), May 14, 1993.
Patent Abstracts of Japan vol. 097, No. 002, Feb. 28, 1997 and JP 08 258535 A (Nippon Denso Co Ltd), Oct. 8, 1996.
Patent Abstracts of Japan vol. 013, No. 094 (M–804), Mar. 6, 1989 & JP 63 287619 A (Nippon Denso Co Ltd), Nov. 24, 1988.
Patent Abstracts of Japan vol. 017, No. 483 (M–1472), Sep. 2, 1993 & JP 05 115522 A (Nissan Motor Co Ltd), May 14, 1993.
French Search Report dated Jul. 4, 1997.

*Primary Examiner*—John K. Ford
*Attorney, Agent, or Firm*—Morgan & Finnegan, L.L.P.

[57] ABSTRACT

A motor vehicle air conditioning installation has a cold loop, a hot loop, a sensor for measuring cabin temperature, a manual setting unit for setting demand values of cabin air parameters, and a control unit for defining the resulting required adjustments to be made to the various components of the cold and hot loops. The control unit includes a temperature estimating module which generates an estimated value of the outside temperature, either from (a) the measured value of cabin temperature (in stabilized operation of the installation), or (b) a temperature value stored in a sub-memory of the control unit (when the installation is converging towards its stabilized mode).

15 Claims, 3 Drawing Sheets

AIR CONDITIONING INSTALLATION WITH AN EXTERNAL TEMPERATURE ESTIMATOR, ESPECIALLY FOR A MOTOR VEHICLE

FIELD OF THE INVENTION

This invention relates to a air conditioning installations, especially for the cabin of a motor vehicle having an engine.

More particularly, the invention relates to such installations of the kind that comprise: a so-called cold loop including at least one compressor, a condenser and an evaporator; a so-called hot loop including a heating radiator which is supplied with a coolant fluid from the engine; an air treatment and distribution unit containing distribution valves and mixing valves, and also containing the heating radiator and the evaporator; a motorised blower unit which supplies fresh air from outside the vehicle, and/or air recirculated from the cabin, to the air treatment and distribution unit, in which the air is treated before being distributed into the cabin of the vehicle; a temperature sensor for measuring the temperature in the cabin (which is referred to in this Application as the inside temperature or cabin temperature); a setting module on which an occupant of the vehicle can set required, or "demand", values of parameters of the atmospheric conditions in the cabin for the purpose of adjusting the installation accordingly; and control means for defining the required adjustments for various adjustable components of the cold and hot loops, having regard to the demand values of parameters as set by the occupant of the vehicle using the setting module, and having regard also to the measured cabin temperature, a temperature outside the cabin (referred to in this Application as the outside temperature), and the state of operation of the engine of the vehicle.

BACKGROUND OF THE INVENTION

Installations of the above type in their simplest form regulate the cabin temperature by comparing the demand temperature which is set by the occupant with the measured value of the prevailing cabin temperature, and then deduce from this comparison what adjustments are necessary in the cold and hot loops of the installation. The adjustments required are then optimised in the case where the installation includes an outside temperature sensor. In order to function in this way, therefore, such an installation requires at least two sensors.

In order to improve the performance of these installations, and the safety of the occupants of the vehicle while the installation is in operation, designers working in this field have tended to resort to more complex installations, which employ sensors adapted for measuring the evaporator temperature and/or the engine coolant temperature (which is generally referred to in this Application, for simplicity, as the water temperature). Some of these installations are also equipped with a temperature sensor for sensing the temperature of the blown air which is distributed from the installation into the cabin, and also, sometimes, a unidirectional or multi-directional sensor for measuring the degree of exposure to sunlight.

This provision of plural sensors adds considerably to the cost and complexity of the installation, and also increases the probability of malfunctioning or failure of the installation.

DISCUSSION OF THE INVENTION

Consequently, an object of the invention is to provide an air conditioning installation which overcomes all or some of the above mentioned drawbacks.

According to the invention, the invention relates to such installations of the kind that comprise:
- a cold loop including at least one compressor, a condenser and an evaporator;
- a hot loop including a heating radiator which is supplied with a coolant fluid from the engine;
- an air treatment and distribution unit containing distribution valves and mixing valves, and also containing the heating radiator and the evaporator;
- a motorised blower unit which supplies fresh air from outside the vehicle, and/or air recirculated from the cabin, to the air treatment and distribution unit, in which the air is treated before being distributed into the cabin of the vehicle;
- a temperature sensor for measuring the inside (i.e. cabin) temperature;
- a setting module on which an occupant of the vehicle can set demand values of atmospheric conditions in the cabin; and
- control means for defining appropriate required adjustments for adjustable components of the cold and hot loops, having regard to:
  the demand values; the measured cabin temperature; the outside temperature; and the state of operation of the engine of the vehicle,
  is characterised in that the control means comprise a control module for controlling the adjustable components, and a temperature estimating module, the temperature estimating module including a first sub-memory for storing a value of temperature, and a first sub-module for supplying to the control module an estimated value of the outside temperature based on:
- either the measured value of the inside temperature, where the installation is not operating or when its operation is stabilised (i.e. the measured value of the inside temperature is equal to the demand temperature),
- or the value of the temperature stored in the first sub-memory, where the installation is in operation but is not yet stabilised (i.e. the measured inside temperature is different from the demand value of the latter).

In this way, an installation is provided which requires only one temperature sensor, this sensor being arranged to measure the inside or cabin temperature.

Preferably, where the installation is not in operation, the estimation of the value of the outside temperature is obtained by identification with the measured value of the cabin temperature.

Preferably, the control means includes a second sub-memory for storing data representing an equation or operation points for at least one of its adjustable components, the second sub-memory being adapted to be read by the first sub-module.

In a first embodiment of the invention, when the installation is operation in a stabilised mode, the estimation of the value of the outside temperature is obtained by solving a differential equation stored in the second sub-memory. This equation relates to constants which depend on: geometrical and structural features of the cabin (for example the volume of the cabin, the energy exchange surface between the cabin and the outside, and the surface area of the cabin which is exposed to the sun); and energy flows between, firstly, the installation and the cabin (for inward energy flow), and secondly, the cabin and the outside (for outward energy flow), each of the said energy flows being dependent on the measured value of the cabin temperature. This enables very fine regulation of the installation to be obtained, because the differential equation memorised in the second sub-memory can be as complex as may be called for by the required degree of fine adjustment.

In a second embodiment of the invention, the second sub-memory stores points of operation of at least some of the adjustable components of the installation, in the form of a first table of correspondence between the values of outside temperature and sets of values, each of which consists of values for adjustment of the positions of the mixing valve and an inside temperature. Thus, when the installation is working in its stabilised mode, the first sub-module is able to estimate the value of the outside temperature by determination of a set of values stored in the correspondence table and being substantially identical to those of the prevailing adjustments of the mixing valve and the measured cabin temperature. As a result, estimation of the outside temperature is obtained by searching for the operating point of the installation to which one of the sets of values memorised in the correspondence table corresponds.

According to a preferred feature of the invention, prior to each startup of the installation, the first sub-module stores in the first sub-memory the last estimated value of the outside temperature, referred to in this Application as the current value or prevailing value. Accordingly, the value of outside temperature which is used next time the installation is started up is the last value of the outside temperature estimated by the first module when the installation was inoperative.

Preferably, the control means of the installation are arranged to define the adjustments for the components of the cold and hot loops, by further derivation from a state of operation and a value of the water temperature, which is estimated by a second sub-module from the estimated value of the outside temperature generated by the first sub-module, and from the operating state of the engine. For this purpose it is preferable to provide a third sub-memory, for storing a first function which describes the laws of variation of the water temperature, as a function of, firstly, the time which has elapsed since an initial start-up of the engine, and secondly, the estimated value of the outside temperature. With this arrangement, and still with only one sensor, being the cabin temperature sensor, it is also possible to estimate the prevailing value of the temperature of the coolant fluid flowing in the engine.

According to another preferred feature of the invention, the control means of the installation are adapted to define the adjustments for the components of the cold and hot loops from, in addition, a temperature of the evaporator, which is estimated by a third sub-module from the estimated value of the outside temperature, the measured value of the cabin temperature, and the state of operation of the compressor. For this purpose it is preferable to provide a fourth sub-memory, in which is stored a second mathematical relationship which describes the laws of variation of the temperature of the evaporator, as a function, firstly, of the time which has elapsed since a first start-up of the compressor, secondly an estimated value of the outside temperature, and thirdly a measured value of the cabin temperature. With this arrangement, and again with only one sensor, being the cabin temperature sensor, it is also possible to estimate the prevailing value of the evaporator temperature.

According to a further preferred feature of the invention where the installation has the second and third modules as defined above, it further includes a fourth sub-module for estimating the temperature of the blown air which has been treated by the air treatment and distribution unit of the installation and distributed into the cabin. This estimation is based on at least the estimated value of the water temperature, the estimated value of the evaporator temperature, the state of operation of the motorised blower unit (i.e. the power output level of the blower), and the prevailing adjustments of the mixing valves. For this purpose it is preferable to provide a fifth sub-memory for storing a third mathematical relationship which describes the laws of variation of the blown air temperature, as a function of, firstly, the adjustments of the mixing valves, secondly an estimated value of the water temperature, thirdly an estimated value of the evaporator temperature, and fourthly, the state of operation of the blower. Thus, and still with the same single internal temperature sensor and no other sensors, it is also possible to estimate the current value of the temperature of the blown air which is distributed into the cabin.

The first, second, third and fourth sub-modules are preferably made in the form of a single electronic component, which is a memory chip or ASIC, with each of the said first, second, third, fourth and fifth sub-memories then constituting the memory of the chip. This enables all the estimation functions for the different temperatures to be grouped in a single component, which can be incorporated directly within the control means.

With a view to improving even more the performance of the installation, correcting means can be provided, for correcting at least one of the estimated values of temperature selected from the group consisting of the outside temperature and the water temperature. To this end, the correcting means preferably comprise:

a fifth sub-module for calculating a theoretical value of cabin temperature from the blown air temperature, the estimated outside temperature and the state of operation of the motorised blower unit;

a sixth sub-module for calculating a first temperature error (or difference) between the measured value of the cabin temperature and the calculated theoretical value of the cabin temperature;

a seventh sub-module for calculating, from the first temperature error, a second and/or a third error (or difference), between the measured and calculated values of the water temperature and outside temperature respectively; and an eighth sub-module for correcting the water temperature estimated at a given instant, from the second or water temperature error, and/or a ninth sub-module for correcting the estimated outside temperature at a given instant from the third, outside temperature, error.

Such correcting sub-modules can of course be integrated in the electronic component that constitutes the first to fourth sub-modules.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
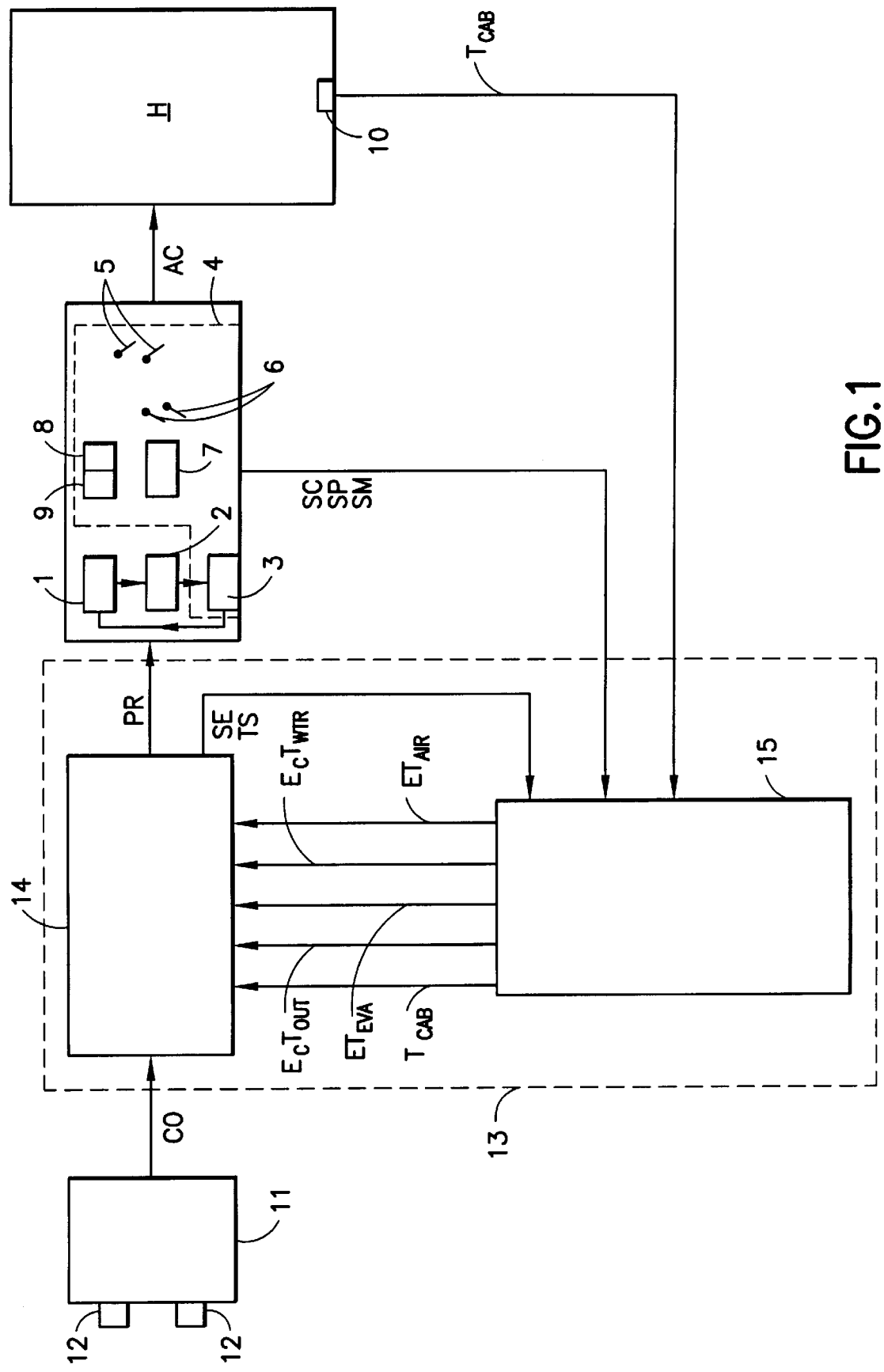
FIG. 1 is a block diagram showing an air conditioning installation in accordance with the invention.

Reference is first made to FIG. 1, to describe in general terms an air conditioning installation for a cabin, which is for example a cabin of a motor vehicle having an engine.

The installation comprises, firstly, a cold loop which consists in particular of a compressor 1, for compressing in the form of a hot gas a refrigerant fluid which passes through it in the form of cold gas, together with a condenser 2 and an evaporator 3. The condenser is arranged to condense into a hot liquid the refrigerant fluid which has been compressed by the compressor 1, while the evaporator 3 is arranged to convert the condensed refrigerant fluid into cold gas which is passed to the compressor 1.

The installation also includes a hot loop which comprises an air treatment and distribution unit 4, for treating the process air and for distributing the treated air to the cabin H of the vehicle. The hot loop also includes a motorised blower unit 8 which is arranged to supply the treatment unit 4 with the process air, consisting of fresh air from outside the vehicle and/or air recirculated from the cabin, for treatment of this fresh air and/or recirculated air in the unit 4. The unit 4 itself includes, in particular, distribution valves 5 for managing the distribution of the process air, after treatment of the latter in the unit 4, to various distribution vents which are located in selected positions in the cabin H. The unit 4 also includes mixing valves 6, a heating radiator 7, and the evaporator 3.

The mixing valves 6, which consist in this example of electromechanical valves, are arranged to regulate the mixture of cold air and hot air within the air treatment unit 4, before this air, having been treated, is distributed into the cabin. The heating radiator 7 heats the fresh and/or recirculated air received from the motorised blower unit 8, and the evaporator 3 cools the fresh and/or recirculated air received by it from the motorised blower unit 8.

In FIG. 1, the air treatment and distribution unit 4 is indicated by broken lines. The respective positions of the various components mentioned above and contained in the casing of the unit 4, as indicated in FIG. 1, have no direct relevance with their actual positions in practice: these components have only been shown within the unit 4 by way of example and in order to facilitate understanding of this description.

The motorised blower unit 8 includes a blower 9, of a variable power type, the power output of which is able to be adapted according to the demands of the installation.

The installation also includes a temperature sensor 10 which is fitted in a selected position within the cabin H, for measuring the temperature in the cabin, which will be referred to as the inside temperature, or cabin temperature, $T_{cab}$.

The installation also includes a setting module 11 which is provided with setting elements 12, such as rotary knobs or digital touch pads, or both, for operation by an occupant of the cabin of the vehicle, who sets the values required (or demand values) of the various parameters of atmospheric conditions in the cabin, with a view to appropriate adjustment of the installation. The setting module 11 is mounted in the fascia of the vehicle, which is installed in the cabin.

In order to enable the various required adjustments corresponding to the demand parameters set by the occupant using the setting module 11 to be established, the installation includes a control unit 13 which is indicated in FIG. 1 by phantom lines. The control unit 13 comprises, in particular, a control module 14 which is adapted to define the required adjustments for the various adjustable components of the cold loop and hot loop of the installation, by derivation from the demand parameters set by the occupant, together with other parameters to which further reference will be made later in this description.

An installation of this type enables the temperature in the cabin H to be regulated. This regulation may be of two types. The first of these types consists of automatic regulation, in which the internal regulation temperature is defined by the manufacturer and set at about 20° C. The second type of regulation is manual regulation, in which the internal regulation temperature is set by the user using the setting module 11, and therefore in this case consists of the demand temperature.

Whether the mode of regulation is automatic or manual, once the demand values of the various parameters have been set by the user by means of the setting module 11, the control module 14 contained in the control unit 13 memorises these demand values, and then issues commands for the adjustment of the installation as a function only of the cabin temperature $T_{cab}$. This cabin temperature, measured by means of the inside temperature sensor 10, is then compared with the demand value of the temperature. Depending on the difference between these two temperatures, the control module 14 computes the adjustments that have to be made in the various adjustable components of the cold and hot loops of the installation.

Thus, the control module can for example decide to put the cold loop into operation so that the air to be distributed into the cabin is cooled by means of the evaporator 3. The operation of the cold loop can be adapted according to the magnitude of this difference between the prevailing value of the cabin temperature and its demand value. For this purpose the temperature $T_{EVA}$ of the evaporator 3 can be made variable.

The control module 14 then computes the respective positions (settings) of the mixing valves 6 and distribution valves 5.

Because of exchanges of energy between the cabin and the outside of the vehicle, representing a net outward energy flow, the temperature prevailing outside the cabin, referred to here as the outside temperature $T_{OUT}$, has an important influence on the regulation of the temperature in the cabin. It is therefore important to know the outside temperature $T_{OUT}$ so as to be able to modify accordingly, if necessary, the required adjustments for the various components of the cold and hot loops.

In conventional installations, the outside temperature is measured using a temperature sensor mounted outside the cabin. The present invention, as exemplified in the installation now being described with reference to the drawings, is radically different in this regard. In this connection, the outside temperature $T_{OUT}$ is estimated by means of a temperature estimating module 15, which is preferably mounted within the control unit 13.

This temperature estimating module 15 will now be described more particularly, with reference to FIG. 2 to which reference is now made.

In its simplest form, the temperature estimating module comprises a first sub-module 16 which is connected to a first sub-memory 17, for storing a value of temperature to which further reference will be made later in this description. The first sub-module 16 is arranged in such a way as to produce an estimated value $ET_{OUT}$ of outside temperature, which it derives solely from its knowledge of the measured value of the inside temperature $T_{cab}$.

Estimation of the outside temperature, to give the estimated value $ET_{OUT}$, is preferably carried out as follows. When the installation is in operation, but with the measured value of the inside temperature $T_{cab}$ being substantially different from the demand value TS of this temperature, the system is in a so-called convergence mode. In this mode, the first sub-module 16 fixes, as the estimated outside temperature value $ET_{OUT}$, the value of the temperature which is stored in the first sub-memory 17. This stored value of temperature in the sub-memory 17 is in fact the value which was the value of the estimated outside temperature $ET_{OUT}$ when the installation was out of operation and just before its operation was started. The memorisation of this parameter $ET_{OUT}$ in the first sub-memory 17 is preferably obtained through the first sub-module 16, but it may of course be obtained through the control module 14. In this connection, the control module 14 is firstly the destination of the parameter $ET_{OUT}$, and secondly the first part of the control unit to be informed of the desire of the user to put the installation into operation.

When the installation is in a so-called stabilised condition, that is to say when the measured value of the internal temperature $T_{cab}$ is substantially identical to the demand value of the temperature, i.e. the regulation temperature TS set by the user, two methods of estimating the outside temperature can then be envisaged.

In the first of these estimating modes, the first sub-module 16 estimates the value of the outside temperature $ET_{OUT}$ by solving a differential equation for the energy flow, of the following type:

$$[Cv_{AIR} \times V_{cab} \times DT_{cab}/DT_{cab}] = [Cv_{AIR} \times Q_{AIR} \times (T_{AIR} - T_{cab})] + [Ab \times S_{ENS} \times ENS] - [Cc \times S_{VEH} \times (T_{cab} - T_{EXT})]. \quad (1)$$

In this equation, $Cv_{AIR}$ indicates the thermal capacity of the air, $V_{cab}$ indicates the volume of the cabin of the vehicle, $Q_{AIR}$ indicates the mass flow of blown (or process) air which is distributed from the installation into the cabin, $S_{ENS}$ indicates the surface area of the vehicle exposed to the sun, and $S_{VEH}$ indicates the heat exchange surface area between the cabin and the outside.

The expression $[CV_{AIR} \times Q_{AIR} \times (T_{AIR} - T_{cab})]$ represents the energy flow entering the cabin. The expression $[Ab \times S_{ENS} \times ENS]$ represents a constant, which only depends on the geometrical and structural features of the cabin, and more generally, of the vehicle. The expression $[Cc \times S_{VEH} \times (T_{cab} - T_{EXT})]$ represents the energy flow passing out of the vehicle.

This differential equation is stored, for example in the form of digital data, in a second sub-memory 19 which can be read by the first sub-module 16. It can easily be solved by circuitry consisting of electronic components which are readily available commercially.

Figure 6:
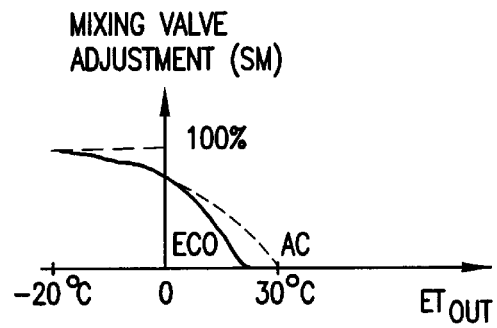
FIG. 6 is a diagram showing the evolution of the position of the mixing valve as a function of outside temperature, and for two different operating modes of the installation.

In the second of the above mentioned two possible modes for estimating the outside temperature, a second sub-memory 19, again arranged to be read by the first sub-module 16, is provided. In this case, a first correspondence table is memorised in the second sub-memory 19, again for example in the form of digital data. This table is a table of correspondence between values of the outside temperature $T_{OUT}$ on the one hand, and sets of values on the other. Each of these sets of values contains values of required adjustments for the positions of the mixing valves 6, together with a value of the inside temperature $T_{cab}$. In other words, the second sub-memory 19 contains operating curves for at least part of the installation, which, given the required values of adjustments of the mixing valves fixed by the control module 14, enable a value $ET_{OUT}$ of the outside temperature to be estimated by deduction from these curves. FIG. 6 shows two of these curves. They represent two different operating modes of the air conditioning installation, the curve shown as a whole line representing an economic, or inexpensive, operating mode, while the curve shown as a broken line represents a standard operating mode.

This way of estimating the outside temperature is really only of value when the installation is in its stabilised condition, because the required adjustments in the respective positions of the various mixing valves 6 are only accessible to the first sub-module 16, in practice, with effect from the instant at which the control module 14 of the installation has already established these required adjustments.

In this second method of estimating the outside temperature, the installation operates as follows. After the adjustments have been stabilised, the first sub-module 16 receives the measured value of the inside temperature $T_{cab}$ from the sensor 10, and the items of information that represent the various required adjustments of the engine and of the components of the cold and hot loops, in particular the positions of the mixing valves 6. These items of information are received from the control module 14 or from the components concerned themselves. The first sub-module 16 then consults the correspondence table stored in the second sub-memory 19, so as to find in the table a set of values substantially identical to those of the prevailing adjustments of the mixing valves 6 and of the measured cabin temperature $T_{cab}$. Corresponding to this set is a value $ET_{OUT}$ of the outside temperature (referred to as the estimated outside temperature), which can be supplied by the first sub-module 16 to the control module 14 so that the latter will then, if necessary, modify the adjustments made to the installation.

When the installation is out of operation, the estimation of the outside temperature $ET_{OUT}$ can be continued using the above mentioned equation (1). To this end it is sufficient to consider that the air flow into the cabin is nil, and this considerably simplifies equation (1). However, when the installation is no longer in operation, it is preferable that the first sub-module should automatically fix the estimated value of the outside temperature at the value of the cabin temperature $T_{cab}$ which has just been measured using the temperature sensor 10.

Figure 2:
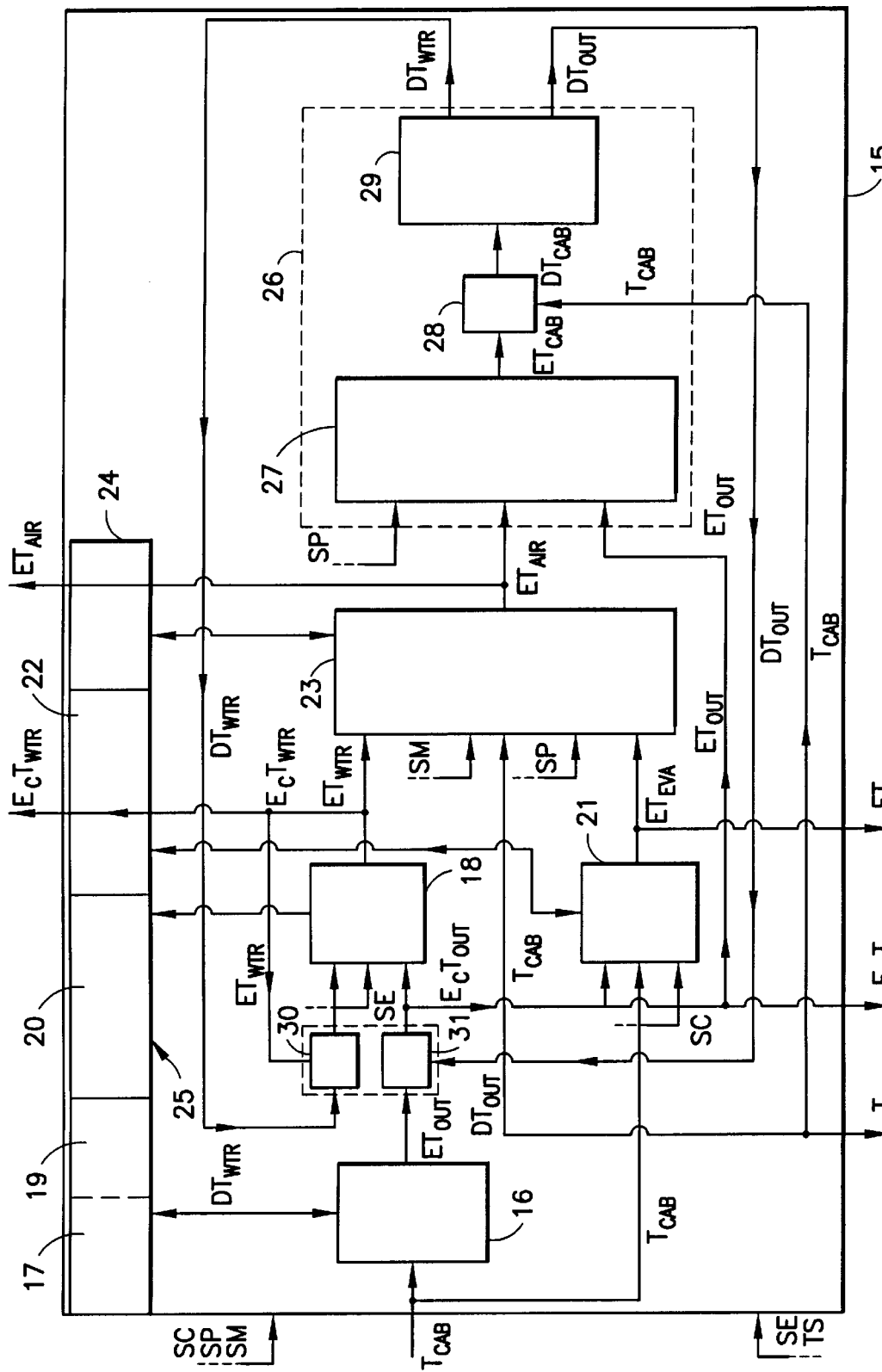
FIG. 2 is a block diagram showing part of the installation according to the invention.

As is shown in FIG. 2, the temperature estimating module 15 can be made able to perform numerous other functions, besides simply the estimation of outside temperature. Thus for example, the control module 14 can be designed so as to carry out a correction to the adjustments of the various components of the cold and hot loops, from its knowledge estimated value $ET_{WTR}$ of the temperature of the water (or more generally, the coolant liquid of the engine). To this end, the installation includes a second sub-module 18 and a third sub-memory 20. The second sub-module 18 estimates the water temperature $T_{WTR}$, to give the estimated value $ET_{WTR}$, from its knowledge of the estimated value of the outside temperature $ET_{OUT}$ as estimated by the first sub-module 16, and from its knowledge of the state of operation SE of the engine. This quantity SE is supplied by the control module 14.

The third sub-memory 20 is arranged to be read by the second sub-module 18. Memorised in the sub-memory 20, for example in the form of digital data, is a first mathematical function which describes the laws of evolution of the engine water temperature $T_{WTR}$ as a function of, firstly, the time which has elapsed since the engine was first started, and secondly an estimated value $ET_{OUT}$ of the outside temperature.

Figure 3A:
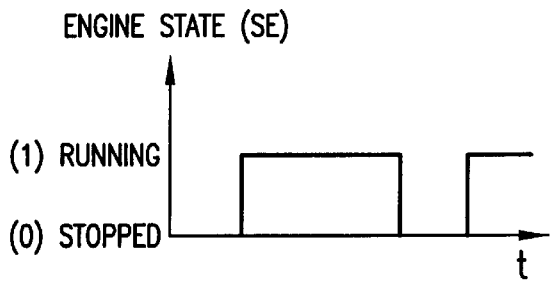
FIG. 3A is a diagram illustrating the state of operation of the engine as a function of time.

The parameter SE representing the state of operation of the engine is only able to assume two values, as is shown in FIG. 3A. These are a nil value (0) when the engine is not running, and a value fixed at unity (1) in binary mode when the engine is running.

Figure 3B:
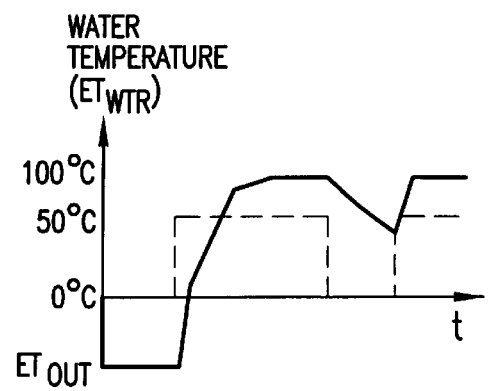
FIG. 3B is a diagram illustrating the evolution of the engine water temperature as a function of time.

FIG. 3B, to which reference is now made, shows a curve for the evolution of the water temperature $ET_{WTR}$ of the engine as a function of time, for a given estimated value of outside temperature $ET_{OUT}$. The engine state SE is again shown, here in broken lines, in FIG. 3B.

The function which is stored in the third sub-memory 20 has, as its variables, the engine state SE and the estimated outside temperature $ET_{OUT}$. In another version, it can be arranged that a multiplicity of functions of the evolution of the water temperature $ET_{WTR}$ of the engine are stored in the third sub-memory 20. These functions represent respective estimated values $ET_{OUT}$ of the outside temperature, with the only variable being the item of data that represents the state of operation of the engine, SE.

The operation of the second module 18 is as follows. On receipt of signals representing the state of operation SE of the engine, and the value $ET_{OUT}$ of outside temperature as estimated by the first module 16, the second module 18 applies the parameters received to the function stored in the third sub-memory 20, to produce an estimated value $ET_{WTR}$ of the water temperature. The module 18 addresses this water temperature value to the control module 14, so that the latter then makes any necessary adjustments in the installation.

The control module 14 may also be made capable of adjusting the components of the cold and hot loops on the basis of the temperature of the evaporator 3. In that case, the installation includes, firstly, a third sub-module 21 for producing an estimated value $ET_{EVA}$ of the evaporator temperature by derivation from the estimated value $ET_{OUT}$ of the outside temperature, the measured value of the inside temperature $T_{cab}$, and the state of operation SC of the compressor 1;

and secondly, a fourth sub-memory 22 which is arranged to be read by the third sub-module 21. The fourth sub-memory 22 memorises a second mathematical function which governs the variation of the evaporator temperature $ET_{EVA}$ as a function of, firstly, the time which has elapsed since a first start of the compressor 1, secondly, an estimated value $ET_{OUT}$ of the outside temperature, and thirdly, a measured value $T_{cab}$ of the inside temperature.

Figure 4A:
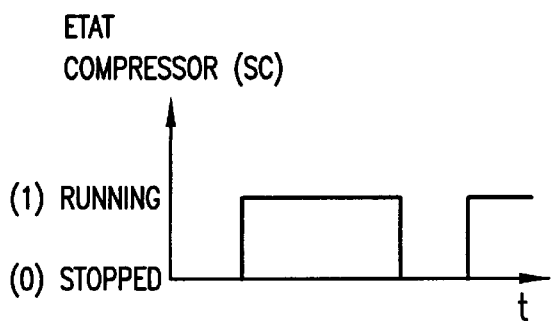
FIG. 4A is a diagram showing the operating state of the compressor as a function of time.
Figure 4B:
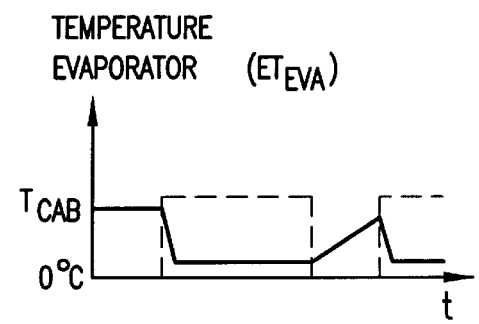
FIG. 4B is a diagram showing the evolution of the evaporator temperature as a function of time.

The state of operation of the compressor, SC, is represented in FIG. 4A, to which reference is now made. The state SC can assume two different values, namely the value 0 when the compressor 1 is not operating, and the value 1 (in binary mode) when the compressor is operating. The curve in FIG. 4B shows the variation in the evaporator temperature $ET_{EVA}$ as a function of time elapsed since the start of operation of the compressor 1, for a given measured value of the inside temperature $T_{cab}$. FIG. 4B also shows in broken lines the state of operation SC of the compressor 1, repeated from FIG. 4A for purposes of comparison.

The method of operation of the third sub-module 21 is as follows. On receiving the signals representing the estimated outside temperature $ET_{OUT}$, the measured inside temperature $T_{cab}$, and the state of operation SC of the compressor, the third sub-module 21 makes use of the second function memorised in the fourth sub-memory 22 to deduce from these three signals an estimated value $ET_{EVA}$ of the evaporator temperature. It transmits a signal representing this estimated value to the control module 14, so that the latter can then make any necessary adjustments in the cold and hot loops of the installation.

The control module 14 may also be so designed that it can make an adjustment to the installation from its knowledge of the temperature $ET_{WTR}$ of the engine coolant (water temperature), and the estimated evaporator temperature $ET_{EVA}$, and also the temperature of the blown air which is distributed by the unit 4 into the cabin H. In this case it is of particular advantage to provide, by way of complement to the second sub-module 18 and the third sub-module 21, a fourth sub-module 23 and a fifth sub-memory 24. The fourth sub-module 23 estimates the blown air temperature $ET_{AIR}$ from at least the following: the estimated value of the water temperature $ET_{WTR}$ as estimated by the second sub-module 18; the value of the evaporator temperature $ET_{EVA}$ as estimated by the third sub-module 21; the operating state of the blower 9 of the motorised blower unit 8; and the current positions SM of the mixing valves 6.

The fifth sub-memory 24 is arranged to be read by the third sub-module 23. A third mathematical function is stored in the fifth sub-memory 24: this third function governs the variation of the blown air temperature $ET_{AIR}$ as a function of, firstly, the current positions SM of the mixing valves 6, secondly an estimated value $ET_{WTR}$ of the water temperature, thirdly an estimated value $ET_{EVA}$ of the temperature of the evaporator 3, and fourthly the operating state SP of the blower 9. This third function may of course be memorised in the form of sets of values in a correspondence table.

Figure 5:
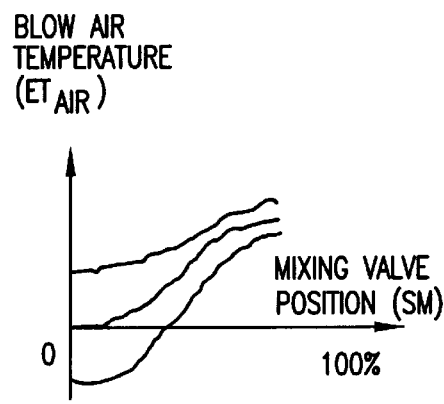
FIG. 5 is a diagram showing the evolution of the temperature of the blown or process air, i.e. the air delivered by the blower, as a function of the position of the mixing valves and for three different values of outside temperature.

Reference is now made to FIG. 5, which shows the variation in the blown air temperature (i.e. the above mentioned third function) as a function of the positions of the mixing valves, for several values of the outside temperature.

The fourth sub-module 23 operates as follows. On receiving signals representing the water temperature $ET_{WTR}$ as estimated by the second sub-module 18, the evaporator temperature $ET_{EVA}$ as estimated by the third sub-module 21, the state of operation SP of the blower 9, the measured value $T_{cab}$ of the cabin or inside temperature, and the positions SM of the mixing valves 6, the fourth sub-module 23 uses the third function stored in the fifth sub-memory 24 to deduce from the above mentioned received parameters an estimated value $ET_{AIR}$ of the blown air temperature. It then transmits a signal representing this estimated value of blown air temperature to the control module 14, so that the latter can make any necessary adjustments to the installation.

The sub-memory (or sub-memories) associated respectively with the various sub-modules 16, 18, 21 and 23 may be either incorporated directly in the sub-module concerned, or they may be grouped in a single memory 25 as indicated in FIG. 2.

In addition, the various estimations carried out by the sub-modules of the temperature estimating module can be improved by incorporating a feedback loop which includes a correcting module 26, indicated in FIG. 2 by broken lines.

In the embodiment shown in FIG. 2, the correcting module 26 corrects the estimated water temperature value $ET_{WTR}$ and the estimated value $ET_{OUT}$ of the outside temperature. To this end, the correcting module 26 includes a fifth sub-module 27 which is capable of estimating a theoretical value $ET_{cab}$ of the cabin temperature from the state of operation of the blower SP, the estimated value $ET_{AIR}$ of the blown air temperature, and the estimated value $ET_{OUT}$ of the outside temperature. This estimation of the theoretical temperature in the cabin is obtained using a mathematical function which is known per se to a person skilled in the art and which it is unnecessary to expound here. The estimated value $ET_{cab}$ of the theoretical inside temperature is passed by the sub-module 27 to a sixth sub-module 28, which also receives the measured value of the inside temperature $T_{cab}$, and which deduces from these variables a temperature difference (or error) $DT_{cab}$. This theoretical temperature error, between the temperature measured in the cabin and the theoretical temperature determined by the fifth sub-module 27, represents modelling errors arising in the operation of the successive sub-modules 16, 18, 21 and 23.

The theoretical error $DT_{cab}$ in the cabin temperature is then addressed to a seventh sub-module 29, the electronic components of which constitute a computing means which is capable of providing, firstly, a theoretical difference or error in the engine coolant temperature, $DT_{WTR}$, and secondly, a theoretical difference or error in the outside temperature $DT_{OUT}$. These two errors can be calculated from the flow equation (1) set forth earlier in this description.

The theoretical error $DT_{WTR}$ in the water temperature is now addressed to an eighth sub-module 30, which also receives the estimated value $ET_{WTR}$ of the engine water temperature, delivered by the second sub-module 18. The eighth sub-module 30 transmits to an input of the second sub-module 18 a corrected value of the water temperature which it has just estimated. Thus, the second sub-module 18 is able to recalculate (or adjust) the estimated value $ET_{WTR}$ of the water temperature which it has just estimated, and can then deliver to the control module 14, and to the fourth sub-module 23, an estimated and corrected value $E_C T_{WTR}$.

In other words, the second sub-module 18 can be set to calculate a corrected estimated value of water temperature from, firstly, the state of operation SE of the engine, secondly the estimated value $ET_{OUT}$ of the outside temperature, and thirdly, the estimation of the water temperature previously carried out to give the value $ET_{WTR}$.

The second temperature error $DT_{OUT}$ delivered by the seventh sub-module 29 is addressed to a ninth sub-module 31, which is interposed between the first sub-module 16 and one of the inputs of the second sub-module 18. The ninth sub-module 31 accordingly receives the estimated value $ET_{OUT}$ of the outside temperature obtained by the first sub-module 16 and the temperature error $DT_{OUT}$ calculated by the seventh sub-module 29, and transmits to the second sub-module 18 an estimated and corrected value $E_C T_{OUT}$ of the outside temperature. This corrected parameter is also addressed to the control module 14.

If the correcting module 26 is absent, the control module 14 will receive from the temperature estimating module 15 an estimated value $ET_{WTR}$ of the water temperature and an estimated value $ET_{OUT}$ of the outside temperature. By contrast, where the correcting module 26 is present, the control module receives from the temperature estimating module 15 a corrected estimated value of water temperature $E_C T_{WTR}$ and a corrected estimated value $E_C T_{OUT}$ of the outside temperature.

It will be seen that the installation described here enables complete regulation of the cabin temperature to be obtained using only one sensor, namely the temperature sensor fitted inside the cabin. Henceforth, therefore, it is no longer necessary to make use of an evaporator temperature sensor, an engine water temperature sensor, a temperature sensor on the outside of the vehicle, or even a temperature sensor for the blown air distributed into the cabin. Using the system according to the invention, all of these temperatures can now be estimated using the temperature estimating module 15.

The temperature estimating module may be in the form of a single dedicated electronic component, for example a memory chip or an ASIC. In addition, it may be incorporated directly in the control unit 13 as shown in FIG. 1.

The invention is not limited to the embodiments described above, but it embraces all versions which may occur to a person skilled in the art within the scope of the Claims of this Application. Thus for example, the temperature estimating module may include only the first sub-module by which the outside temperature is estimated. In another version it may comprise this first sub-module together with the second sub-module and/or the third sub-module, or again, the first sub-module together with the second, third and fourth sub-modules. The inclusion of a correcting module 26 in the estimating module is optional, as has been suggested above.

However, the invention does not preclude the installation from being provided with auxiliary sensors for measuring parameters that are not capable of being modelled. One example of such a parameter is the level of exposure of the vehicle to sunlight, if it is desired to improve the performance of the installation even more.

What is claimed is:

1. An apparatus for regulating the air temperature within a cabin of a vehicle having an engine, comprising:

(a) a cooling loop having a compressor, a condenser and an evaporator;

(b) a heating loop having a heating radiator and containing engine coolant fluid;

(c) a blower unit which supplies air flow to the cabin;

(d) an air treatment unit in communication with the evaporator and the heating radiator and having mixing valves for directing the air flow over the evaporator and/or the heating radiator to regulate the temperature of the air supplied to the cabin;

(e) an air temperature sensor for detecting the temperature of the air in the cabin;

(f) a setting module for selecting a desired temperature value of the air in the cabin;

(g) a means for detecting the state of operation of the apparatus; and (h) a control unit for regulating the operation of the mixing valves, the blower unit, the cooling loop and/or the heating loop to achieve and maintain the cabin air temperature at or about the desired cabin air temperature value, the control unit comprising:

i) a control module coupled to the setting module and the means for detecting the state of operation of the apparatus, the control module being adapted to determine the required adjustments for regulating the operation of the mixing valves, the blower unit, the cooling loop and/or the heating loop based on the prevailing cabin air temperature, the desired cabin air temperature value of the setting module and an estimated external air temperature; and ii) an estimating module comprising (1) a first sub-module coupled to the air temperature sensor and the control module, the first sub-module being adapted to (a) generate an estimated external air temperature (i) when the apparatus is inoperative, (ii) when the apparatus is operative and the air temperature in the cabin is substantially the same as the desired temperature value of the setting module, and (iii) when the apparatus is operative and the air temperature in the cabin is substantially different from the desired temperature value of the setting module, and (b) supply an estimated external air temperature value to the control module;

(2) a first sub-memory coupled to the first sub-module and adapted to store an estimated external air temperature value generated by the first sub-module; and (3) a second sub-memory coupled to the first sub-module and adapted to store data representing a differential equation for determining the estimated external air temperature based on the geometrical and structural features of the cabin and the energy flows between the apparatus and the cabin and between the cabin and the external atmosphere, the first sub-module being adapted to solve the differential equation and determine an estimated external air temperature.

2. An apparatus according to claim 1, wherein the geometrical and structural features of the cabin comprise the volume of the cabin, the energy exchange surface between the cabin and the external atmosphere, and the surface area of the cabin exposed to the sun.

3. An apparatus according to claim 2, wherein:

(a) when the apparatus is not operating, the estimated external air temperature is set by the first sub-module to equal the cabin air temperature detected by the air temperature sensor;

(b) when the apparatus is operating and the temperature of the air in the vehicle cabin detected by the air temperature sensor is substantially different from setting module air temperature value, the estimated external air temperature is set by the first sub-module to equal the temperature value stored in the first sub-memory; and (c) when the apparatus is operating and the temperature of the air in the vehicle cabin detected by the air temperature sensor is substantially the same as the setting module air temperature value, the estimated external air temperature is generated by the first sub-module using the following differential equation:

$$[Cv_{AIR} \times V_{cab} \times DT_{cab}/DT_{cab}] = [Cv_{AIR} \times Q_{AIR} \times (T_{AIR} - T_{cab})] + [Ab \times S_{ENS} \times ENS] - [Cc \times S_{VEH} \times (T_{cab} - T_{EXT})]$$

where

Ab, ENS, Cc and $S_{ENS}$ are constants, $Cv_{AIR}$ is the thermal capacity of the air, $V_{cab}$ is the volume of the vehicle cabin, $Q_{AIR}$ is the mass flow of air supplied by the air treatment unit to the vehicle cabin, $S_{ENS}$ is the surface area of the vehicle exposed to the sun, $S_{VEH}$ is the heat exchange surface between the cabin and the external environment, $T_{cab}$ is the measured temperature of the air in the cabin vehicle, $T_{AIR}$ is the temperature of the air supplied by the air treatment unit to the vehicle cabin, $T_{EXT}$ is the estimated external air temperature.

4. An apparatus for regulating the air temperature within a cabin of a vehicle having an engine, comprising:

(a) a cooling loop having a compressor, a condenser and an evaporator;

(b) a heating loop having a heating radiator and containing engine coolant fluid;

(c) a blower unit which supplies air flow to the cabin;

(d) an air treatment unit in communication with the evaporator and the heating radiator and having mixing valves for directing the air flow over the evaporator and/or the heating radiator to regulate the temperature of the air supplied to the cabin;

(e) an air temperature sensor for detecting the temperature of the air in the cabin;

(f) a setting module for selecting a desired temperature value of the air in the cabin;

(g) a means for detecting the state of operation of the apparatus; and (h) a control unit for regulating the operation of the mixing valves, the blower unit, the cooling loop and/or the heating loop to achieve and maintain the cabin air temperature at or about the desired cabin air temperature value, the control unit comprising:

i) a control module coupled to the setting module and the means for detecting the state of operation of the apparatus, the control module being adapted to determine the required adjustments for regulating the operation of the mixing valves, the blower unit, the cooling loop and/or the healing loop based on the prevailing cabin air temperature, the desired cabin air temperature value of the setting module and an estimated external air temperature; and ii) an estimating module comprising:

(1) a first sub-module coupled to the air temperature sensor and the control module, the first sub-module being adapted to (a) generate an estimated external air temperature (i) when the apparatus is inoperative, (ii) when the apparatus is operative and the air temperature in the cabin is substantially the same as the desired temperature value of the setting module, and (iii) when the apparatus is operative and the air temperature in the cabin is substantially different from the desired temperature value of the setting module, and (b) supply an estimated external air temperature value to the control module;

(2) a first sub-memory coupled of the first sub-module and adapted to store an estimated external air temperature value generated by the first sub-module; and (3) a second sub-memory coupled to the first sub-module and adapted to store data representing theoretical operating points embodied in a table of correspondence between (1) external air temperature values and (2) sets of values consisting of at least one adjustable component of the apparatus, the first sub-module being adapted to deduce the estimated external air temperature from the theoretical operating points when the apparatus is operative and the air temperature in the cabin is substantially the same as the desired temperature value of the setting module.

5. An apparatus according to claim 4 wherein the second sub-memory is adapted to store data representing theoretical operating points embodied in a table of correspondence between (1) external air temperature values and (2) a set of values of adjustments to the mixing valve, the first sub-module being adapted to deduce an estimated external air temperature from the theoretical operating points stored in the second sub-memory based on the prevailing adjustments to the mixing valve when the apparatus is operative and the air temperature in the cabin is substantially the same as the desired temperature value of the setting module.

6. An apparatus according to claim 4, wherein the second sub-memory is adapted to store data representing theoretical operating points embodied in a table of correspondence between (1) external air temperature values and (2) a set of values of adjustments to the mixing valve and a set or values of cabin air temperature, the first sub-module being adapted to deduce an external air temperature value from the table of theoretical operating points based on the prevailing adjustments to the mixing valve and the prevailing cabin air temperature when the apparatus is operative and the air temperature in the cabin is substantially the same as the desired temperature value of the setting module.

7. An apparatus for regulating the air temperature within a cabin of a vehicle having all engine, comprising:
 (a) a cooling loop having a compressor, a condenser and an evaporator;
 (b) a heating loop having a heating radiator and containing engine coolant fluid;
 (c) a blower unit which supplies air flow to the cabin;
 (d) an air treatment unit in communication with the evaporator and the heating radiator and having mixing valves for directing the air flow over the evaporator and/or the heating radiator to regulate the temperature of the air supplied to the cabin;
 (e) an air temperature sensor for detecting the temperature of the air in the cabin;
 (f) a setting module for selecting a desired temperature value of the air in the cabin;
 (g) a means for detecting the state of operation of the engine;
 (h) a means for detecting the state of operation of the apparatus; and
 (i) a control unit for regulating the operation of the mixing valves, the blower unit, the cooling loop and/or the heating loop to achieve and maintain the cabin air temperature at or about the desired cabin air temperature value, the control unit comprising:
  i) a control module coupled to the setting module, the means for detecting the state of operation of the apparatus and the means for detecting the state of operation of the engine, the control module being adapted to determine the required adjustments for regulating the operation of the mixing valves, the blower unit, the cooling loop and/or the heating loop based on the prevailing cabin air temperature, the desired cabin air temperature value of the setting module, an estimated external air temperature and an estimated engine coolant fluid temperature; and
  ii) an estimating module comprising
   (1) a first sub-module coupled to the air temperature sensor and the control module, the first sub-module being adapted to (a) generate an estimated external air temperature (i) when the apparatus is inoperative, (ii) when the apparatus is operative and the air temperature in the cabin is substantially the same as the desired temperature value of the setting module, and (iii) when the apparatus is operative and the air temperature in the cabin is substantially different from the desired temperature value of the setting module, and (b) supply an estimated external air temperature value to the control module;
   (2) a first sub-memory coupled to the first sub-module and adapted to store an estimated external air temperature value generated by the first sub-module; and
   (3) a second sub-module coupled to the first sub-module and the control module, the second sub-module being adapted to (a) generate an estimated engine coolant fluid temperature value based on an estimated external air temperature value and the state of operation of the engine, and (b) supply the estimated engine coolant fluid temperature value to the control module.

8. An apparatus according to claim 7, wherein the estimating module further comprises a third sub-memory adapted to store data representing an equation defining the variations of engine coolant fluid temperature as a function of the time elapsed since the engine was started and the estimated external air temperature value.

9. An apparatus for regulating the air temperature within a cabin of a vehicle having an engine, comprising:
 (a) a cooling loop having a compressor, a condenser and an evaporator;
 (b) a heating loop having a heating radiator and containing engine coolant fluid;
 (c) a blower unit which supplies air flow to the cabin;
 (d) an air treatment unit in communication with the evaporator and the heating radiator and having mixing valves for directing the air flow over the evaporator and/or the heating radiator to regulate the temperature of the air supplied to the cabin;
 (e) an air temperature sensor for detecting the temperature of the air in the cabin;
 (f) a setting module for selecting a desired temperature value of the air in the cabin;
 (g) a means for detecting the state of operation of the compressor;
 (h) a means for detecting the state of operation of the apparatus; and
 (i) a control unit for regulating the operation of the mixing valves, the blower unit, the cooling loop and/or the heating loop to achieve and maintain the cabin air temperature at or about the desired cabin air temperature value, the control unit comprising:
  i) a control module coupled to the setting module and the means for detecting the state of operation of the apparatus, the control module being adapted to determine the required adjustments for regulating the operation of the mixing valves, the blower unit, the cooling loop and/or the heating loop based on the prevailing cabin air temperature, the desired cabin air temperature value of the setting module, an estimated external air temperature value and an estimated evaporator temperature value; and
  ii) an estimating module comprising
   (1) a first sub-module coupled to the air temperature sensor and the control module, the first sub-module being adapted to (a) generate an estimated external air temperature (i) when the apparatus is inoperative, (ii) when the apparatus is operative and the air temperature in the cabin is substantially the same as the desired temperature value of the setting module, and (iii) when the apparatus is operative and the air temperature in the cabin is substantially different from the desired temperature value of the setting module, and (b) supply an estimated external air temperature value to the control module;
   (2) a first sub-memory coupled to the first sub-module and adapted to store an estimated external air temperature value generated by the first sub-module; and (3) a third sub-module coupled to the first sub-module, the means for detecting the state of operation of the compressor and the control module, the third sub-module being adapted to (a) generate an estimated evaporator temperature value based on an estimated external air temperature and the state of operation of the compressor and the prevailing cabin air temperature, and (b) supply the estimated evaporator temperature value to the control module.

10. An apparatus according to claim 9, wherein the estimating module further comprises a fourth sub-memory adapted to store data representing an equation defining the evaporator temperature as a function of (a) the time elapsed since the compressor was started, (b) the estimated external air temperature value, and (c) the prevailing cabin air temperature value.

11. An apparatus according to claim 7, wherein the control module is further adapted to determine the required adjustments for regulating the operation of the mixing valves, the blower unit, the cooling loop and/or the heating loop based on an estimated temperature of the evaporator, the apparatus further comprises a means for detecting the state of operation of the compressor, and the estimating module further comprises:

(a) a third sub-module coupled to the first sub-module, the means for detecting the state of operation of the compressor and the control module, the third sub-module being adapted to (1) generate an estimated evaporator temperature value based on an estimated external air temperature and the state of operation of the compressor and the prevailing cabin air temperature, and (2) supply an estimated evaporator temperature value to the control module; and (b) a fourth sub-memory coupled to the third sub-module, the fourth sub-memory being adapted to store data representing an equation defining the evaporator temperature as a function of (1) the time elapsed since the compressor was started, (2) the estimated external air temperature value, and (3) the prevailing cabin air temperature value.

12. An apparatus according to claim 11, wherein the control module is further adapted to determine the required adjustments for regulating the operation of the mixing valves, the blower unit, the cooling loop and/or the heating loop based on estimated temperature of the air flow distributed into the cabin, the apparatus further comprises a means for detecting the state of operation of the blower unit, and the estimating module further comprises:

(a) a fourth sub-module coupled to the second sub-module, the third sub-module, the means for detecting the state of operation of the blower unit and the control module, the fourth sub-module being adapted to (1) generated an estimated temperature of the air flow distributed into the cabin based on the estimated engine coolant fluid temperature; the estimated evaporator temperature; the operating state of the blower unit; and the adjustments of the mixing valves, and (2) supply an estimated air flow temperature value to the control module; and (b) a fifth sub-memory coupled to the fourth sub-module, the fifth sub-memory being adapted to store data representing an equation defining the temperature of the air flow distributed into the cabin as a function of (1) the estimated engine coolant fluid temperature, (2) the estimated evaporator temperature, (3) the state of operation of the blower unit and (4) the adjustments of the mixing valves.

13. An apparatus according to claim 12, wherein the control unit includes a memory chip comprising electric components each of which constitutes a respective one of the first, second, third and fourth sub-modules, with each of the first, second, third, fourth and fifth sub-memories constituting the memory of the memory chip.

14. An apparatus according to claim 12, wherein the estimating module further comprises correcting means for correcting the estimated value of at least one temperature selected from the group consisting of the estimated external air temperature and the estimated engine coolant fluid temperature, the estimating module being adapted to deliver to the control module the estimated and corrected temperature values.

15. An apparatus according to claim 14, wherein the correcting means comprises at least one sub-module selected from the group consisting of: a fifth sub-module adapted to calculate a theoretical value of the air temperature in the cabin based on the estimated air flow temperature, the estimated external air temperature and the operating state of the blower unit; a sixth sub-module adapted to compute a first error between the measured air temperature in the cabin and the calculated theoretical value of the air temperature in the cabin; a seventh sub-module adapted to compute, from the first error, at least one further temperature difference selected from the group consisting of a second error in the estimated engine coolant fluid temperature and a third error in the estimated external air temperature, an eighth sub-module adapted to correct, from the second error, the value of the engine coolant fluid temperature estimated at a given instant; and a ninth sub-module adapted to correct, from the third error, the value of the external air temperature estimated at a given instant.

* * * * *